United States Patent [19]

Riechmann

[11] 3,796,827

[45] Mar. 12, 1974

[54] LOW VOLTAGE SUPPLY CIRCUIT FOR SOLID-STATE T.V. RECEIVER, WITH FEEDBACK INHIBITOR

[75] Inventor: Werner Riechmann, Sibbesse, Germany

[73] Assignee: Blaupunkt-Werke GmbH, Hildesheim, Germany

[22] Filed: Dec. 7, 1972

[21] Appl. No.: 311,719

[30] Foreign Application Priority Data

Dec. 17, 1971 Germany .......... 2162881

[52] U.S. Cl. ....... 178/7.3 R, 178/DIG. 11, 315/27 R
[51] Int. Cl. .......... H04n 5/44
[58] Field of Search ....... 178/7.3 R, 7.5 R, DIG. 11; 315/27 R, 27 TD

[56] References Cited

UNITED STATES PATENTS

| | | | |
|---|---|---|---|
| 3,436,591 | 4/1969 | Grundmann | 315/27 |
| 3,461,232 | 8/1969 | Wendt | 178/7.3 |
| 3,621,134 | 11/1971 | Waring | 178/7.3 R |

*Primary Examiner*—Robert L. Richardson
*Attorney, Agent, or Firm*—Flynn & Frishauf

[57] ABSTRACT

To prevent feedback of inductive peaks in low-voltage supply circuits of solid-state television receivers, in which a low-voltage supply circuit is energized during the retrace interval from the line deflection circuit, and in which the line deflection circuit includes controlled rectifiers, which controlled rectifiers might be triggered spuriously by such feedback peaks, an inhibiting circuit is connected to the rectifier circuit of the low-voltage supply, which is fed from an inductance, to suppress feedback through the inductance upon sudden drawing of current by the supply circuit; this inhibit circuit may be an inductance connected in series with the rectifier of the low-voltage supply, or an additional source of direct current which pre-charges the smoothing capacitor of the rectifier circuit; such low voltage d-c can be obtained, for example, from the filament transformer for the cathode ray tube, with a half-wave rectifier, the voltage being delivered to the low-voltage supply being less than that normally required by the low-voltage supply so that, when the low-voltage supply draws current, the half-wave rectifier will block and prevent power from being fed from the supply into the power transformer.

7 Claims, 2 Drawing Figures

Figure 1:
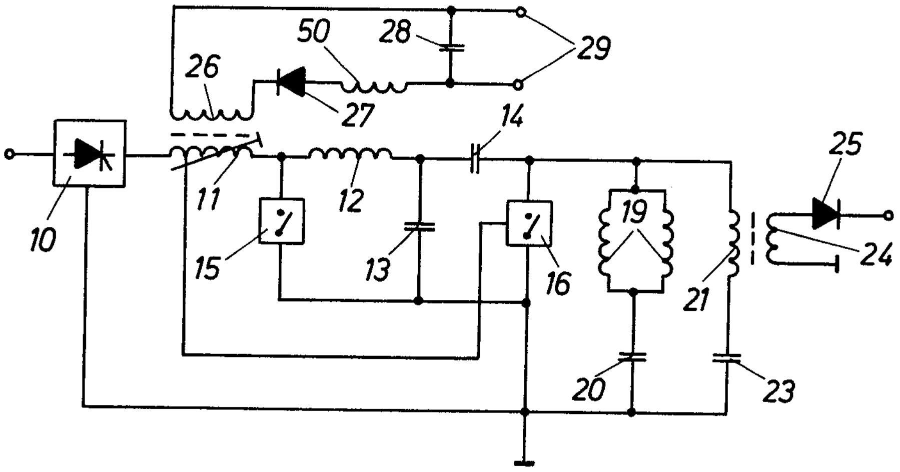

LOW VOLTAGE SUPPLY CIRCUIT FOR SOLID-STATE T.V. RECEIVER, WITH FEEDBACK INHIBITOR

Cross reference to related application: U.S. Ser. No. 240,473, now U.S. Pat. No. 3,766,314.

The present invention relates to a low-voltage supply circuit for television receivers with solid-state, semiconductor horizontal deflection circuits, and more particularly to such circuits in which the energy for the horizontal deflection is derived during the line trace interval and stored in storage capacitors.

The inventor's cross referenced U.S. Pat. No. 3,766,314 of Oct. 16, 1973, assigned to the assignee of the present application, discloses a circuit in which a charge inductance of a predetermined, adjustable inductivity is provided with an additional winding, the additional winding having a rectifier circuit connected thereto, the rectifier circuit supplying the low-voltage supply circuit. The value of inductance of the inductivity, or coil, is so adjusted that during the charging phase or cycle, a voltage maximum will result which is independent of changes in loading on the horizontal deflection circuit, so that the low-voltage supply circuit is practically independent of changes in loading as well. A tap point on the charge inductivity provides trigger pulses for the controlled rectifiers thereof.

Fully transistorized T.V. receivers frequently utilize controlled rectifiers in the horizontal deflection circuits. Such circuits with controlled rectifiers have a high degree of reliability; U.S. Ser. 721,383 and now U.S. Pat. No. 3,452,244 (assigned RCA) discloses a circuit of this type.

Television receivers which are highly transistorized, that is, are essentially solid-state, require low-voltage supply which is well stabilized. It is possible to use a power transformer connected to the line circuit, and a rectifier and stabilizing circuit to provide an essentially stabilized output voltage. This, however, is an expensive solution and it is therefore desirable to provide the required low-voltage operating energy without a power transformer. It has been proposed (see U.S. Ser. No. 477,718, and now U.S. Pat. No. 3,436,591 assigned RCA) to provide an R-C parallel circuit, in series with a controlled silicon rectifier, which is rendered to be conductive during the line retrace interval. In accordance with this system, an energy storage condenser which is connected in parallel to the horizontal deflection winding is discharged during the line retrace interval by the parallel connected silicon rectifier. At least a portion of the charge is stored on the R-C parallel circuit. A voltage is derived from the R-C parallel circuit and applied to other stages of the television receiver, for example to the vertical deflection circuit. The direct current to be derived should be stable and of such quality that it is suitable to supply other stages with a lower voltage than that of the horizontal deflection circuit. It has been found that the stability of these direct current voltages frequently is not adequate, since changes in loading at the output of the horizontal deflection circuits have a tendency to affect the direct voltage. Thus, additional stabilization circuits are necessary.

The cross referenced U.S. Pat. No. 3,766,314, discloses a circuit in which the stability of the low-voltage supply circuit for other stages of the fully transistorized T.V. receiver is substantially enhanced. Thus, and in accordance with the disclosure, the low-voltage supply circuit is derived from the horizontal deflection circuit by coupling the supply circuit to a charge inductance, or coil, by an additional winding, and connecting the additional winding to a rectifier circuit. The value of inductance of this coil, which acts as a transformer, is so set that the voltage maximum will occur at the inductance during the charging phase, which voltage maximum is essentially independent from loading of the horizontal deflection circuit. A suitable voltage supply for the horizontal deflection circuit can thus also supply, by means of the circuit disclosed in the aforementioned application, all other stages of a solid-state T.V. receiver requiring relatively low operating voltages, and with a high degree of stability. These operating voltages are effectively constant, or stabilized, are independent of changes in loading on the horizontal deflection circuit (as, for example, governed by changes in beam current of the cathode ray tube).

It has been found that if this circuit uses the charge inductance also as a source of trigger pulses for controlled rectifiers, disturbances may be introduced into the trigger circuit when the horizontal deflection circuit becomes energized. These disturbances are caused by the first charge pulses into the charge capacitor of the rectifier circuit, since the charge inductivity is loaded with peak current pulses. It is thus possible that semi-conductor trigger pulses will occur spuriously, at phase positions which are undesired.

It is an object of the present invention to improve the circuit of the aforementioned application Ser. No. 240,473 in that feedback of effects from the low-voltage rectified voltage supply into the horizontal deflection circuit, and particularly during start of the horizontal deflection trace, is avoided.

SUBJECT MATTER OF THE PRESENT INVENTION

Briefly, the circuit of the aforementioned U.S. Pat. No. 3,766,314 (the disclosure of which is herein incorporated) additionally has an inhibitor circuit connected thereto which prevents feedback of current changes arising in the rectifier circuit to the deflection supply circuit, that is, to the inductance (which is tapped to provide trigger pulses) of the horizontal deflection circuit.

In accordance with an embodiment of the invention, an additional choke, or inductance is connected in series with a rectifier element of the rectifier circuit of the low-voltage supply. This solution increases the inherent, internal resistance of the low-voltage supply circuit. If, for other circuit reasons, the internal resistance should not be increased then, in accordance with another embodiment of the present invention, a direct voltage is applied to the rectifier circuit in order to precharge the smoothing capacitor before the work cycle of the horizontal deflection circuit starts. In accordance with a feature of the invention, the direct current voltage can be derived, simply, from a transformer having a diode connected in series therewith. No separate transformer is necessary, since the filament winding of the power transformer for the cathode ray tube can be used. Such a transformer is present in the T.V. receiver.

Figure 2:
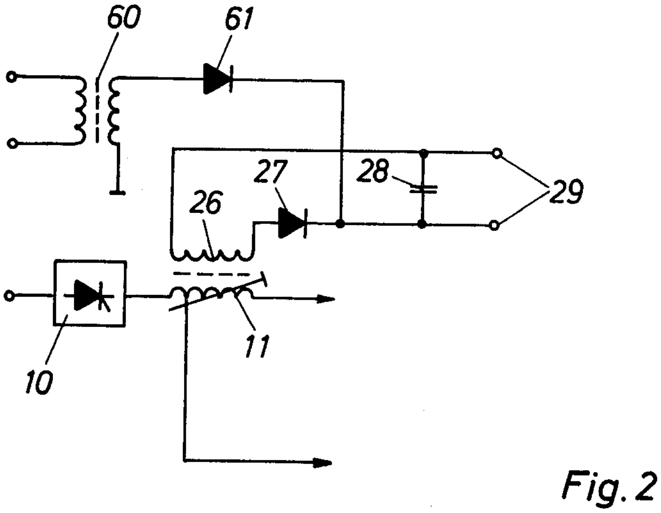

The invention will be described by way of example with reference to the accompanying drawings, wherein:

FIG. 1 is a schematic circuit diagram of one embodiment of the present invention, and in which a choke, or inductance is connected in the low-voltage rectifier supply circuit; and FIG. 2 is a fragmentary circuit diagram illustrating that portion of the diagram of FIG. 1 which is modified, to introduce a d-c voltage to the low-voltage stabilized rectified voltage source.

A stabilized voltage source 10, for example a thyristor stabilized rectifier circuit provides energy for the horizontal deflection circuit over a controlled charge inductivity 11. Charge inductivity 11 has a further inductivity 12 connected in series thereto, which inductivity 12 functions as a commutating coil. Two storage capacitors 13, 14 are connected to the inductivity 12. A pair of controlled switches 15, 16, preferably each formed of a thyristor and an anti-parallel connected diode are connected, as shown, to capacitors 13, 14. The horizontal deflection coils 19 are connected parallel to thyristor 16, and in series with a capacitor 20. Primary winding 21 of line transformer 22, in series with a further capacitor 23, is connected in parallel to the line transformer windings 19 — capacitor 20 circuit. The line transformer 22 has a high voltage winding 24 which is connected to a voltage multiplier circuit 25 to provide a suitable high voltage. The charge inductivity 11 has a tap point 11', connected to control the switch 16, for example by being connected to the control gate of a thyristor.

The circuit, so far described, is known and is explained for example in application Ser. No. 721,383 (assigned RCA) as well as in the aforementioned U.S. Pat. No. 3,766,314, assigned to the assignee of the present invention.

The controllable charge inductivity 11 has a further winding 26 thereon, which is inductively coupled to winding 11, so that between windings 11 and 26 transformer effect will result. A rectifier 27 is connected to winding 26, and the output of the rectifier has a smoothing capacitor connected parallel to the output terminals 29 of the low-voltage supply circuit.

In accordance with a feature of the present invention, an inductance 50 is connected in series to the rectifier 27. The inductance 50, connected in the rectifier circuit 27, 28 reduces the smoothing currents in the capacitor 28, so that spurious trigger pulses cannot arise at the tap point 11' of inductance 11.

The horizontal deflection circuit of FIG. 2 is identical to that of FIG. 1 and is not shown again and not described in detail. Only so much of it as is material is shown, that is inductance 11 and the trigger terminal tap 11', as well as the stabilized voltage source 10. The additional winding 26 is again coupled inductively to the inductance 11, and has the rectifier circuit 27, 28 connected thereto. Differing from the embodiment of FIG. 1, however, the feedback inhibitor circuit is not an additional inductance, but rather is a source of direct current voltage which is applied to the junction point of the rectifier 27 and the smoothing capacitor 28. The direct current voltage is derived from a transformer 60 and a diode 61. Transformer 60, preferably, is a power transformer to provide filament voltage for the T.V. cathode ray tube.

Operation: The capacitor 28 is pre-charged in a few milliseconds, so that, for example, when the horizontal deflection circuit later becomes energized, for example about 150 milliseconds later, charge currents will result which do not cause any undesired, spurious or interfering trigger pulses. When the horizontal deflection circuit is fully energized, the capacitor 28 is charged to such an extent that the diode 61 has reverse voltage applied thereto, thus blocking feedback into the transformer 60 and preventing loading thereof by the circuit of diode 61. This circuit has the advantage with respect to that of FIG. 1 that the low-voltage supply circuit 26, 27, 28 retains its low inherent resistance, in accordance with the aforementioned application No. 240,473.

Various changes may be made in accordance with the inventive concept.

I claim:

1. In a stabilized low-voltage supply circuit for solid-state television receivers having a horizontal deflection circuit which comprises controllable rectifier elements (15, 16), an inductance, and storage capacitor means (13, 14) having charge energy applied thereto by said controllable rectifier elements during line trace interval for storage in said capacitor means;

a low-voltage supply circuit including an additional winding (26) inductively coupled to the inductance (11) and a rectifier circuit (27, 28) connected to the additional winding to be responsive to peak values of voltage and providing, at its output, said stabilized supply voltage;

the inductivity of the inductance (11) being dimensioned to have a voltage peak appear thereat during the charging interval which is independent of changes in loading on the horizontal deflection circuit, and said inductance having a tap (11') which is connected to control at least one (16) of the controlled rectifier elements (15, 16), the improvement comprising inhibitor circuit means (50; 60, 61) connected into the additional winding-rectifier circuit (26-27, 28) of the low-voltage supply circuit and suppressing feedback effects between the inductance (11) and the additional winding (26) upon start of energy transfer to the charging capacitors, and inhibiting spurious peaks at said inductance (11) and its tap (11') and thus inhibit spurious triggering of said at least one controlled recitifier element.

2. Circuit according to claim 1, wherein said inhibitor circuit means comprises an inductance (50) connected in the rectifier circuit (27, 28), in series with and behind the rectifier (27) thereof.

3. Circuit according to claim 1, wherein said inhibitor circuit means comprises means (60, 61) introducing a direct current voltage into the low-voltage supply circuit.

4. Circuit according to claim 3, comprising a transformer (60) and a diode, the output voltage of the transformer being applied over the diode and being dimensioned such that the diode blocks upon transfer of energy from said inductance (11) over said additional winding (26) to the low-voltage supply circuit, to isolate the transformer from the low-voltage supply circuit.

5. Circuit according to claim 4, wherein said low-voltage supply circuit comprises a smoothing capacitor, the voltage supplied by the transformer (60) and the diode (61) pre-charging said smoothing capacitor (28).

6. Circuit according to claim 1, wherein the low-voltage supply circuit comprises a rectifier (27) and a smoothing capacitor (28), and wherein said inhibitor circuit means comprises means (60, 61) pre-charging the smoothing capacitor (28) in advance of charging of said capacitor means (13, 14) of the horizontal deflection circuit.

7. Circuit according to claim 6, wherein the means to pre-charge the smoothing capacitor (28) comprises a source of alternating current (60) and a rectifier means (61) providing a voltage less than the voltage of the low-voltage supply circuit, the rectifier means blocking and isolating the source of a-c from the low-voltage supply circuit when the low-voltage supply circuit provides its nominal output voltage.

* * * * *